Nov. 15, 1955  S. E. TAYLOR  2,723,591
TIMED FOCUS TACHISTOSCOPE
Filed Feb. 23, 1952  3 Sheets-Sheet 1

INVENTOR.
STANFORD E. TAYLOR
BY
Raymond A. Paquin
ATTORNEY.

Nov. 15, 1955 S. E. TAYLOR 2,723,591
TIMED FOCUS TACHISTOSCOPE
Filed Feb. 23, 1952 3 Sheets-Sheet 2
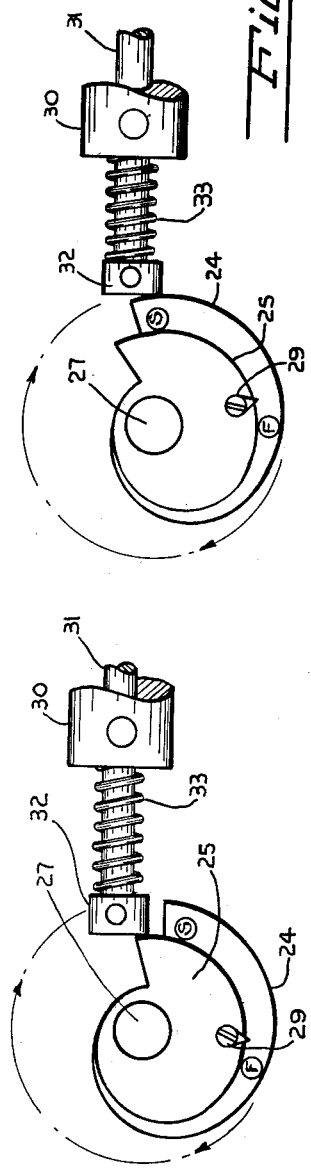
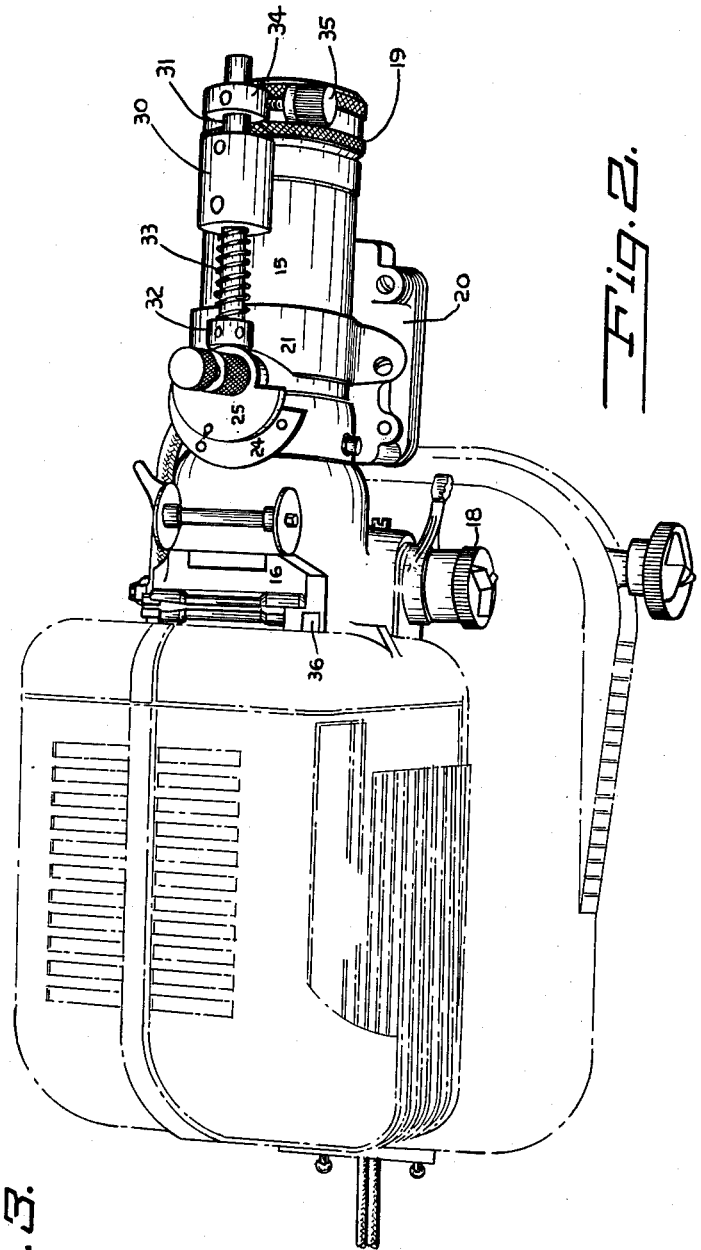
INVENTOR.
STANFORD E. TAYLOR
BY
Raymond A. Paquin
ATTORNEY.

Nov. 15, 1955 S. E. TAYLOR 2,723,591
TIMED FOCUS TACHISTOSCOPE
Filed Feb. 23, 1952 3 Sheets-Sheet 3
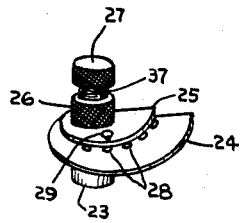
Fig. 5.
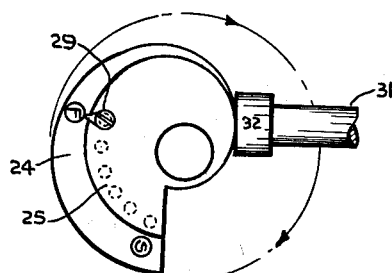
Fig. 6.
Fig. 7.
Fig. 8.
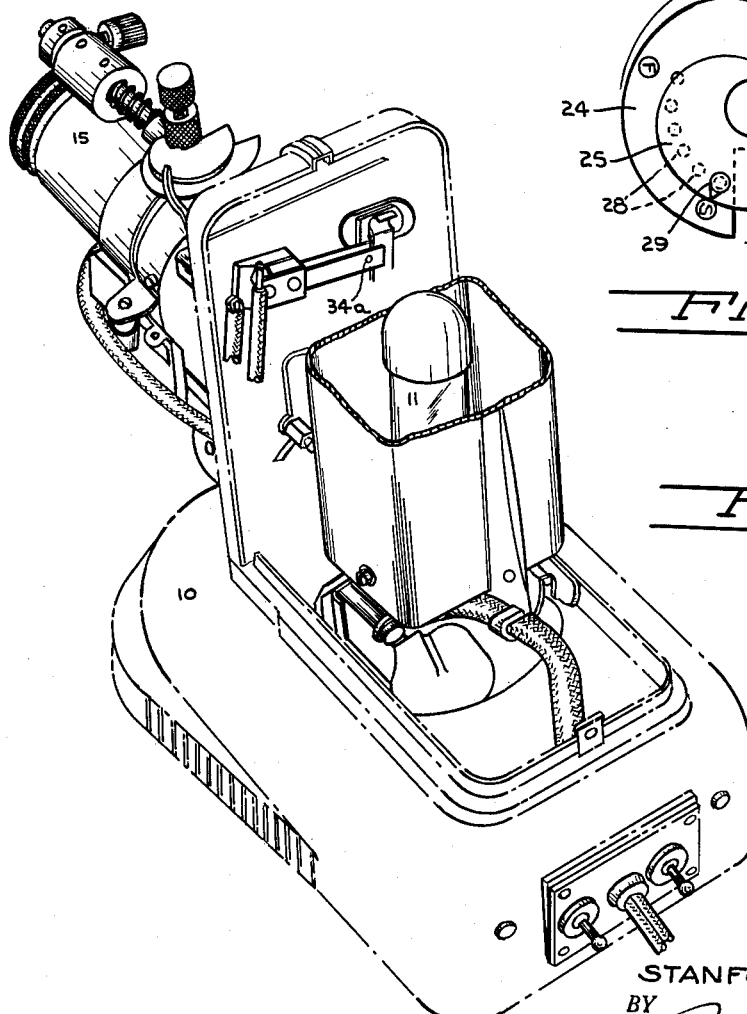
INVENTOR.
STANFORD E. TAYLOR
BY
Raymond A. Paquin
ATTORNEY.

United States Patent Office 2,723,591
Patented Nov. 15, 1955

2,723,591
TIMED FOCUS TACHISTOSCOPE
Stanford E. Taylor, Levittown, N. Y.
Application February 23, 1952, Serial No. 272,926
4 Claims. (Cl. 88—20)

This invention relates to a new and improved apparatus for exhibiting projectable materials tachistoscopically for increasing the ability of a person to visually perceive with greater speed and accuracy and with a greater degree of apprehension.

An object of the invention is to provide a new and improved changeable timed focus tachistoscopic device.

Another object of the invention is to provide a new and improved device of the type set forth wherein the period of time that the projected material is in focus is variable at will.

Another object of the invention is to provide a device for accomplishing the purpose set forth above which device is reatlively simple and inexpensive in construction and efficient and trouble free in operation.

Another object is to provide a device of the type set forth which can be embodied in conventional type film slide projectors.

Another object of the invention is to provide means for controlling the operation of a projection apparatus whereby the material being projected may be brought into focus automatically on a screen for a desired period of time and then brought out of focus automatically after such period of time.

Another object is to provide means for automatically moving the projection lens system or objective of a projection apparatus so as to bring the material being projected into focus on a screen for a pre-determined time and then automatically moving said projection lens system or objective to a position where said projected image will be out of focus.

Other objects and advantages of the invention will be apparent from the following description taken in connection with the accompanying drawings. It will be understood that changes may be made in the details of construction and arrangement of parts, as the preferred form has been shown by way of illustration only.

Referring to the drawings:

Fig. 2 is a top perspective view of the device shown in Fig. 1;

Fig. 3 is a fragmentary top or plan view thereof;

Fig. 4 is a view similar to Fig. 3 but showing the apparatus at another point in its operation;

Fig. 5 is a perspective view of the means for varying the timing of the apparatus;

Fig. 6 is a view similar to Figs. 3 and 4, but showing the apparatus at another point in its operation;

Fig. 7 is a view similar to Figs. 3, 4 and 6 and further illustrating the operation of the device; and Fig. 8 is a rear perspective view of the projection apparatus with the cover thereof removed.

Figure 1:
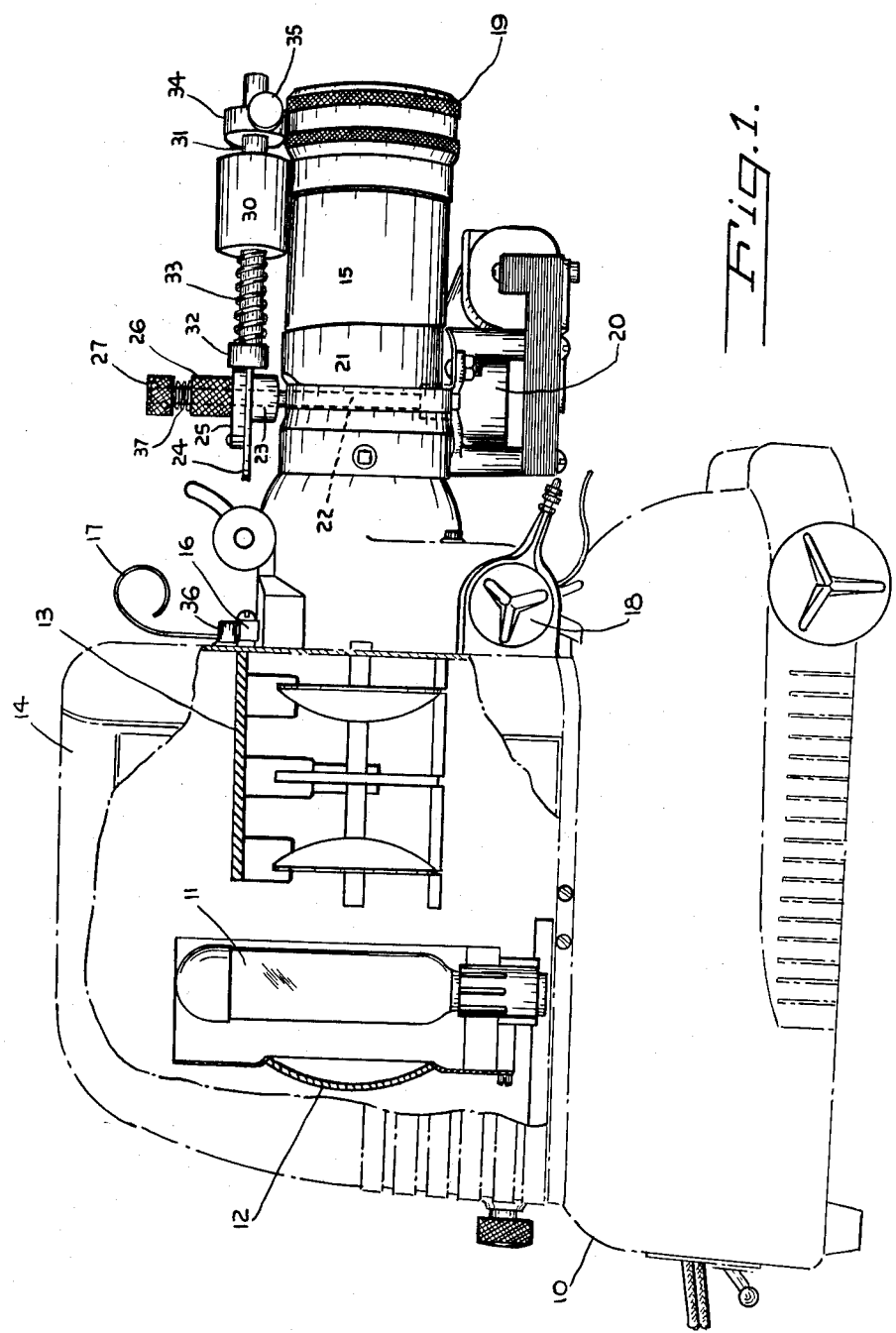
Fig. 1 is a side view, partly in section, of a projection apparatus embodying the invention.

The device of the present invention is particularly adapted for controlled exposure exercises in perception training based on short exposure techniques and designed to develop rapid and accurate perception, improve eye and hand coordniation, broaden the span of apprehension, increase discriminatory ability and improve the individual's capacity for organized retention of subject matter. Gaining facility in these skills is basic to the most efficient learning in the areas of reading, spelling, phonics, word recognition, computation, and other fundamental subject skills and also the broader results of increasing this awareness, concentration and organization in the individuals being trained.

The device of the present invention accomplishes the above results by tachistoscopic exposure of film strip or equivalent projectable material by causing the projected image on the screen to be blurred or unreadable, allowing the image to clear or become readable for a pre-determined time and then returning the image to an unrecognizable blurred state. This is accomplished automatically and the time that the image is readable or clearly visible may be varied as desired.

Referring more particularly to the drawings wherein similar reference characters designate corresponding parts throughout, the invention is shown, for the purpose of illustration as embodied in a film slide or film strip projector which comprises the base 10 on which is positioned the projection lamp or light source 11, reflector 12 and condensing lens system 13, all enclosed within the case or cover 14.

The projection tube 15 is optically aligned with the condensing lens system 13 and the film gate or the like 16 is provided for the film strip or film slide 17 which is advanced by manually operated knob 18.

The projection or objective lens barrel 19 containing the usual projection lens system is mounted for reciprocation in projection tube 15, that is, for movement in opposite directions whereby said objective or projection lens system may be brought into such position that the projected image is focused clearly on the projection screen and moved out of such position at which time the projected image is unrecognizable upon the screen.

In the present invention means is provided for automatically moving said projection lens system or objective back and forth relative to the film strip or material to be projected, automatically, whereby the projected material will be brought into recognizable condition on the screen for a pre-determined period of time and then changed to an unrecognizable state. This mechanism comprises a motor 20 which may be secured on the projection tube 15 by the clamp 21 as shown or otherwise secured on the projection apparatus. The motor shaft 22 extends upwardly through the center of the projection tube 21 and this shaft 22 should preferably be of such small size as not to seriously interfere with the projection through projection tube 15.

On the exposed end of shaft 22 above projection tube 15 is provided support 23 on which is positioned the cam member comprising cams 24 and 25 which are retained in adjusted relation by means of member 26 and knob or set screw 27 between which is positioned spring 37. Knob or set screw 27 may be employed for manually rotating the cams as hereinafter described.

The cam 24 as seen in Figures 3, 4, 5, 6 and 7 is a flat plate having a spiral edge for engagement with cam follower 32. The spiral edge, it will be noticed, has a least radius such that the lens will be pushed by spring 33 to a position too close to the projection material for proper focus when the follower 32 is opposite said least radius, and, as the cam rotates, the lens, through follower 32 and against spring 33, is pushed to a position beyond the point of clear focus. The least radius and the greatest radius lie adjacent each other, so when the cam element 25 is in the position shown in Figure 6 there will be no dwell of the lens at the correct focus. Figures 3 and 4 show a position of cam element 25 with respect cam 24 to provide a short dwell of the lens in focusing position. That is, the edge of said cam element 25 stops the lens at the point of focus and holds it there while the follower 32 passes along element 25. The dwell of the lens at focus when the cam elements 24, 25 are adjusted as shown in Figure 7 is obviously more than twice that for the adjustment shown in Figures 3 and 4.

The cam 24 is provided with a series of holes or slots 28 into a desired one of which is positioned a pin 29 on cam 25 for retaining the cams in adjusted relative position and the cams are adapted to be retained in such adjusted position with pin 29 in desired opening 28 by means of members 26 and 27.

On the upper side of projection tube 15 is provided bearing member 30 having a bore in which is slidably mounted rod 31 having the head or enlarged portion 32 adapted to engage cams 24 and 25 and to be retained in engagement therewith by means of coil spring 33 which bears against said head portion 32 at one end and against the side or bearing member 30 at its opposite end.

On the upper side of the barrel for the projection or objective lens system 19 is provided the bearing member 34 having a bore through which rod 31 extends and the relative position of said rod may be varied by means of set screw 35 which allows the adjustment of the objective or projection lens system and this adjustment after once being made is not usually made again unless the projection distance is varied because of changes in the distance between the projector and screen as will be seen.

Cams 24 and 25 are yieldably held in engagement by coil spring 37.

In the drawings, the letters F and S on cam 24 indicate "Fast" and "Slow" respectively and refer to the time of exposure, that is, whether the projected material is to be exposed in recognizable condition for a shorter time in which case a faster exposure is allowed or for a longer time in which case a longer or slower exposure is allowed and the series of openings 28 in cam 24 are provided for receiving pin 29 on cam 25 as previously described and the series of openings from S to F allow the variation of the relative position of cams 24 and 25 in progression to give progressively shorter exposure time as desired.

In Fig. 4, the cams and objective actuating rod 31 are shown in out of focus position, ready to begin an exposure and in Fig. 3, the cams and rod are shown in focusing position, that is, at the position that the objective or projection lens system will be in such position that the projected image will be in focus and recognizable on the projection screen.

The direction of rotation of cams 24 and 25 is indicated by the arrows in Figs. 3, 4, 6 and 7.

In Fig. 7, the cams are shown in adjusted position for slow exposure and the rod 31 and cams are shown at the position they are in at the end of the timed exposure and in Fig. 6, the cams and rod are shown in position for rechecking.

The motor 29 is energized by depressing the control button 36 to cause electrical contacts 34a to be engaged whereby current is supplied to motor 20 for energizing the same and upon release of said control button 36, contacts 34a are separated and the supply of electrical current to motor 20 is discontinued.

In operation of the device, a film strip is inserted into film gate 16 of the projector in the conventional manner and advanced by manually operated knob 18 to projection position.

The operator turns knob 27 in the indicated direction until shaft or rod 31 rests on smaller cam 25, as shown in Fig. 3. This is focus position and set screw 35 is loosened and objective or projection lens barrel and system 19 moved either in or out to position to sharply focus the projected image on the projection screen.

This focusing need not usually be repeated until the projection distance, that is, the distance between the projector and the projection screen is changed.

The electrical contact button 36 is then pressed and the motor rotates the cams to the out-of-focus position of Fig. 4 at which time the apparatus is ready for use.

The film strip actuating knob 18 is then rotated to advance the frame of the film strip to be projected to projection position.

Electrical control button 36 is then pressed and motor 20 causes cams 24 and 25 to rotate. Enlarged head 32 on shaft 31 then rides on cam 24 until the indention on cam 24 is reached and shaft 31 then snaps to cam 25 until its indention is reached. The shaft 31 then snaps to its most extended position. As previously stated, coil spring 33 urges shaft 31 toward cams 24 and 25 and any movement of shaft 31 effects simultaneous movement of projection lens barrel and system 19 to the same extent and in the same direction as shaft 31 is positively connected to said lens barrel.

The action set forth above completes the tachistoscopic exposure. Riding on cam 24, the projected image is out of focus. Shaft 31 then snaps to cam 25 as shown in Fig. 6 and then to its final out of focus position.

The time that the projection lens system is in focused position, that is, in position to project a recognizable image on the projection screen is determined by the relative position of cams 24 and 25 which position may be changed as shown in the drawing and described above.

After the tachistoscopic cycle, the projected image can then be brought back to a secondary focus position for checking purposes. This refocus position is brought about by again depressing contact button 36 and allowing cams 24 and 25 to be rotated and force shaft 31 outwardly and thus carrying the projection lens system to secondary focus position. The contact button is then released to retain the projected image in focused position on the screen for checking by the viewer or class and the contact button 36 is then depressed again and cams 24 and 25 rotated to bring shaft 31 into the position shown in Fig. 4 for the start of the next exposure and the film strip is then advanced to bring the next frame thereof into projection position and the cycle repeated.

From the foregoing, it will be seen that I have provided new and improved means for obtaining all of the objects and advantages of the invention.

I claim:

1. In a device for exhibiting projectable materials tachistoscopically for increasing the ability to visually perceive with greater speed, accuracy and apprehension, a light source, lens means optically aligned therewith, means for supporting material to be projected between said light source and said lens means, and means for effecting relative displacement of said lens means and said means for supporting material to be projected to bring the projected image into focus for a controlled time and then out of focus while said material to be projected is retained stationary in projection position, said means comprising cam means for effecting said relative displacement means to drive said cam means and means for effecting return of said displaced lens means to normal position, said cam means comprising a pair of relatively adjustable cam members and means for locking said adjustable cam members in adjusted relation whereby the time said image is to be in focused position may be varied.

2. In a device for exhibiting projectable materials tachistoscopically for increasing the ability to visually perceive with greater speed, accuracy and apprehension, a light source, lens means optically aligned therewith, means for supporting material to be projected between said light source and said lens means, and means for effecting relative displacement of said lens means and said means for supporting material to be projected to bring the projected image into focus for a controlled time and then out of focus while said material to be projected is retained stationary in projection position, said means comprising motor operated cam means for effecting said relative displacement and means for effecting return of the displaced lens means to normal position, said cam means comprising a pair of relatively adjustable cam members and means for locking said adjustable cam members in adjusted relation whereby the time said image is to be in focused position may be varied.

3. A tachistoscope comprising a support for projection material, lens means optically aligned with said material, a light source to illuminate said projection material, means for effecting relative displacement of said lens means axially thereof said means including an adjustable cam, a cam follower secured to said lens means, means to drive said cam, and means to hold said cam follower in operative engagement with said cam, said cam means comprising a rotatable plate having a spiral edge for engagement with said cam follower to move said lens means from a position too close to the projection material for clear focus to a position beyond the point of clear focus, and having radial portion of said spiral, and a second plate, rotatable with said spiral plate, having a sector presenting an edge of such radius as to hold said lens means in focused position, said second plate being rotatable with respect to said spiral plate whereby a greater or lesser length of said sector may be exposed to hold said lens means in focussed position.

4. A tachistoscope comprising a support for projection material, lens means optically aligned with said material, a light source to illuminate said projection material, means for effecting relative displacement of said lens means axially thereof said means including an adjustable cam, a cam follower secured to said lens means, means to drive said cam, and means to hold said cam follower in operative engagement with said cam, said adjustable cam comprising two parts, a first cam part coacting with the cam follower to move the lens means from an innermost out of focus position to an outermost out of focus position and release it for return to its innermost position, and a second cam part angularly adjustable with respect to said first part so as to coact with the cam follower to arrest the return of said lens means at its focused position for a length of time determined by the angular adjustment between said two parts.

References Cited in the file of this patent

UNITED STATES PATENTS

| 1,273,068 | Jurgensen | July 16, 1918 |
| 1,488,027 | Runcie | Mar. 25, 1924 |
| 2,410,237 | Renshaw | Oct. 29, 1946 |

FOREIGN PATENTS

| 354,538 | Great Britain | Aug. 13, 1931 |